Oct. 28, 1969      J. H. HOLLYDAY      3,474,603
CHOPPER AND BALER ASSEMBLY
Filed Dec. 2, 1966      3 Sheets-Sheet 1
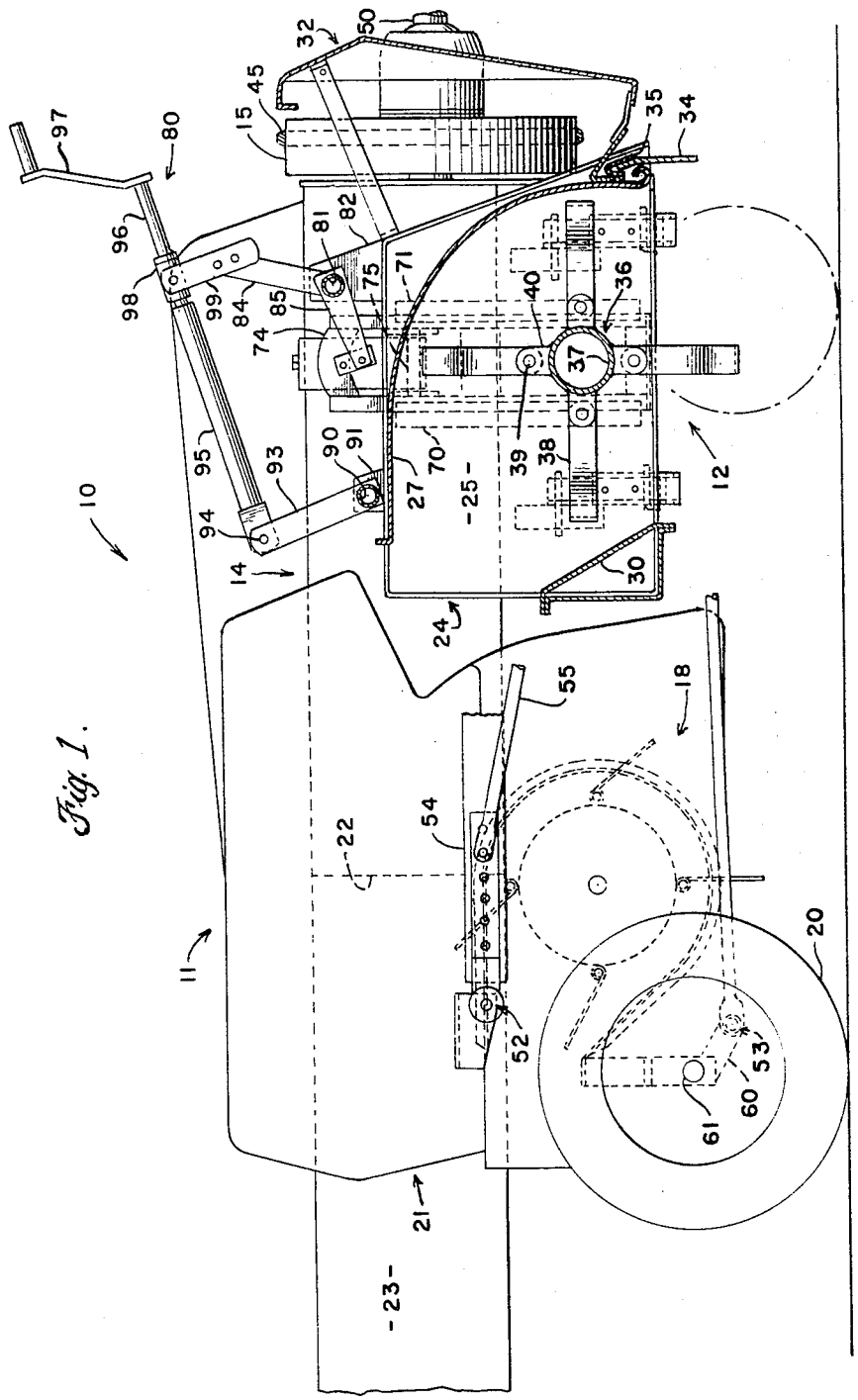
INVENTOR.
JAMES H. HOLLYDAY
BY
Donald D. Schaper
ATTORNEY

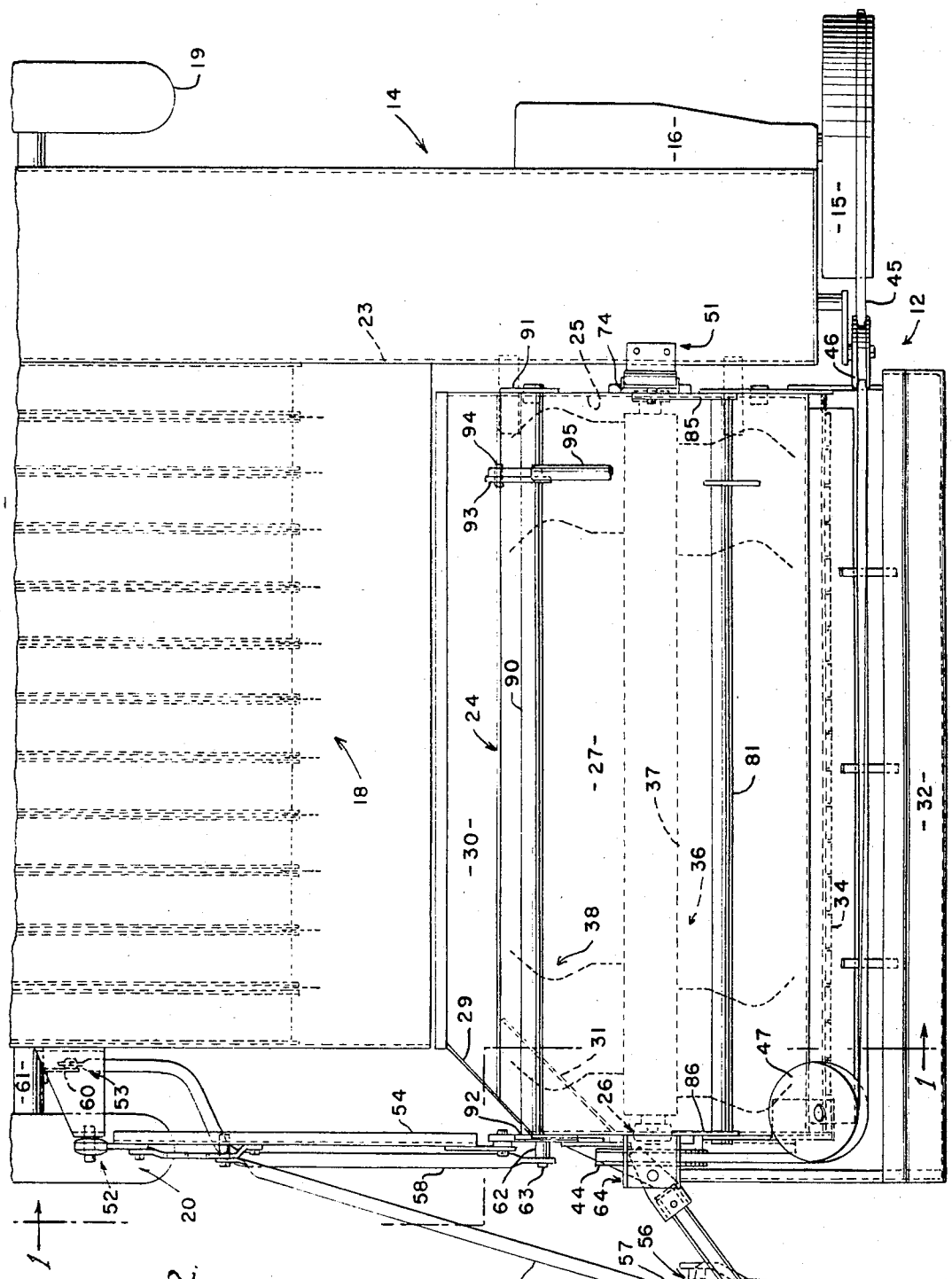

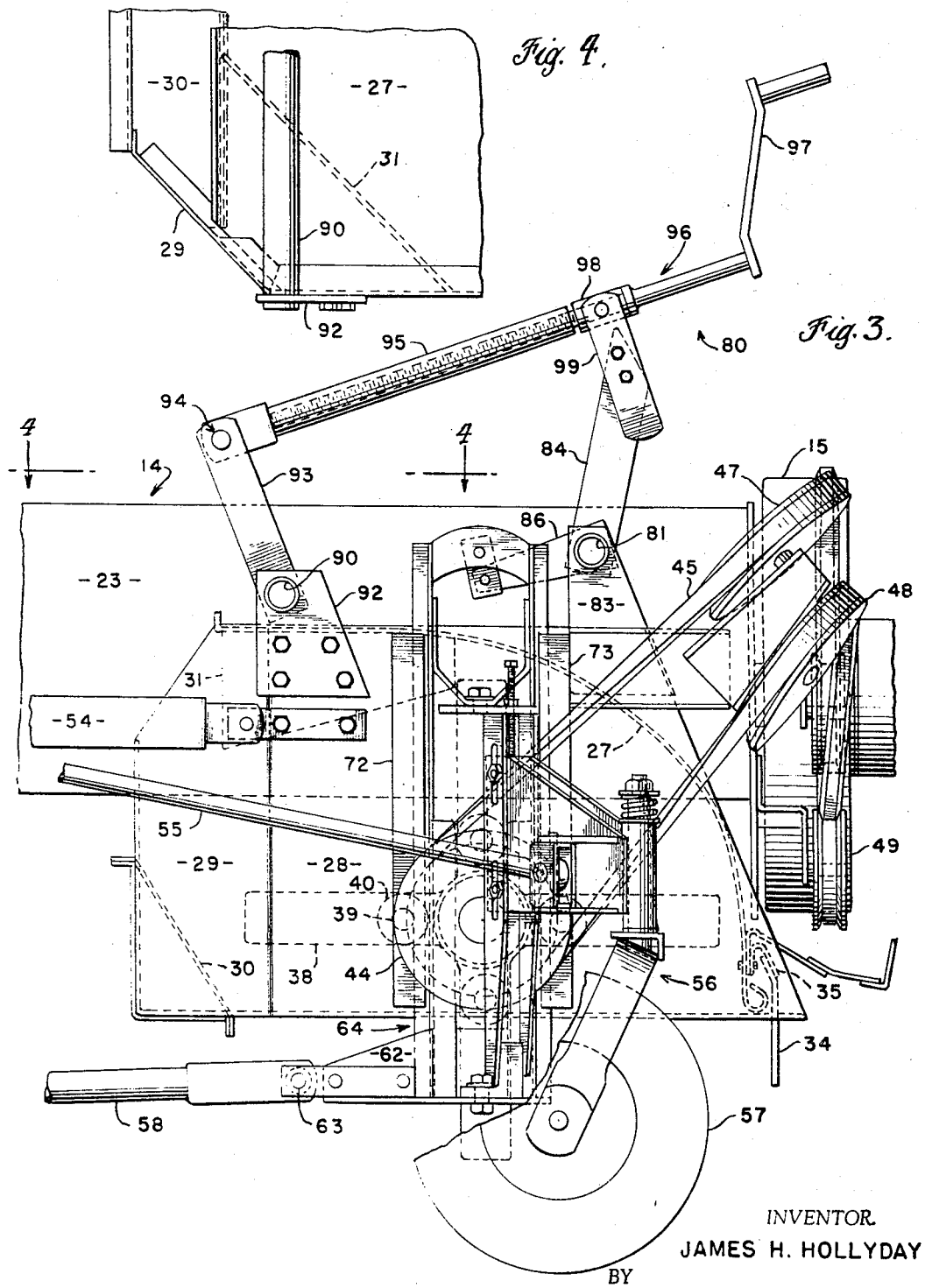

United States Patent Office 3,474,603
Patented Oct. 28, 1969

3,474,603
CHOPPER AND BALER ASSEMBLY
James H. Hollyday, New Holland, Pa., assignor to Sperry Rand Corporation, New Holland, Pa., a corporation of Delaware
Filed Dec. 2, 1966, Ser. No. 598,766
Int. Cl. A01d 37/00, 89/00
U.S. Cl. 56—24    3 Claims

ABSTRACT OF THE DISCLOSURE

An agricultural machine having a rotary flail-type cutter for cutting standing crop material from a field and a baling mechanism for forming the severed crop material into bales.

Background of the invention

This invention is particularly applicable to harvesters of the type which are adapted to cut and/or collect crop material from a field and form it into bales.

It has become increasingly common in recent years to bale corn stalks and like material to be used for bedding for farm animals. Corn stalks, which range in height from 4 to 6 feet, remain in the field after the ears have been removed from the plants. One method of harvesting the corn stalks has been to cut the stalks with a rotary chopper, rake the stalks into windrows, and then bale the stalks with a conventional baler. This method, however, is relatively expensive and the rough exposed ground in the corn fields makes the cutting and raking operations difficult.

A machine comprising a baler and a rotary chopper has been found to be the most effective means for severing the corn stalks from the ground and forming them into bales. There are two known types of machines for performing this operation. In the first type of machine, a chopper unit replaces the conventional rotatable pick-up in a baler. In the second type, a chopper is mounted forwardly of the baler pick-up, and the pick-up functions in combination with the chopper to feed the crop material into the baler.

One of the main problems with the prior-art machines is their relatively narrow effective width. In these machines, the effective width is normally equal to the pick-up width of a conventional baler. Thus, many passes over the field are required, and in some cases, it is difficult for the operator to maintain the machine in position to effectively harvest more than one row of corn at a time.

Summary of the invention

This invention is directed to the use of a relatively wide rotary chopper in combination with a conventional pick-up baler. The rotary chopper comprises novel deflector means to direct the flow of crop material into the baler at the outboard side of the machine.

The chopper deflector means are mounted in the chopper housing and include a deflector plate positioned over the chopper rotor which functions in combination with a housing wall portion located rearwardly of the deflector plate and substantially parallel thereto. As material passes through the chopper, most of the material at the outboard end of the chopper will be deflected inwardly by the deflector plate. If some of the material escapes under the deflector plate, it will be turned inwardly by the housing wall portion.

It is a principal object of this invention to provide in a machine of the type described a baler unit having a pick-up of conventional width and a chopper wider than the pick-up with means to consolidate crop material processed by the chopper before it enters the baler.

Another object of this invention is to provide a machine of the type described which has cutter means of sufficient width to effectively and simultaneously harvest two normally spaced rows of corn.

A further object of this invention is to provide a machine of the type described having a baler unit and a relatively wide chopper removably attached thereto wherein the baler unit can function as a conventional baler with little or no modification when the chopper is removed therefrom.

Other objects and advantages of this invention will be apparent hereinafter from the specification and from the recital in the appended claims.

Brief description of the drawings

FIG. 1 is a sectional elevational view of the machine, taken approximately on the line 1—1 of FIG. 2, showing the baler unit and the chopper unit mounted thereto;

FIG. 2 is a plan view of the machine, substantially as shown in FIG. 1, showing the outboard end of the chopper unit and the means for attaching it to the baler unit;

FIG. 3 is an enlarged fragmentary elevational view, as viewed from the right in FIG. 2; and FIG. 4 is a fragmentary plan view, taken as indicated by the line 4—4 in FIG. 3, showing the crop material deflector means.

Description to the preferred embodiment

Referring now to the drawings by numerals of reference and particularly to FIG. 1, the machine of this invention is designated generally 10. Machine 10 comprises a baler unit 11 of conventional construction and a chopper unit 12.

Baler unit 11 comprises a bale case 14, a reciprocating plunger (not shown) movable in the bale case, a flywheel 15 which drives the plunger through a gearbox 16, a rotatable pick-up 18, and ground wheels 19 and 20. A feed chamber 21 is located rearwardly of the pick-up 18 and is in communication with a feed opening 22 in an upright side wall 23 of bale case 14. Feeder means, not shown, sweep material across the chamber 21 and into the bale case. An example of the type of feeder means referred to is shown in the U.S. patent to Nolt et al., 3,115,823. It will be apparent to those skilled in the art that crop material fed into the bale case through feed opening 22 is compressed and formed into bales, and a tying means, not shown, binds the crop material with wire or string.

Chopper unit 12 comprises a housing 24 having an open bottom and including an inboard side wall 25 adjacent bale case 14, an outboard side wall 26, laterally spaced from the inboard side wall, and an arcuate top wall 27 extending between and joining the side walls. Outboard side wall 26 is formed from a generally fore-and-aft extending forward wall portion 28 and an inwardly extending rear wall portion 29. At the rear end of housing 24, a bracket member 30 extends between and joins the side walls to give the housing rigidity.

Deflector means, as best shown in FIG. 4, comprises wall portion 29 and a deflector plate 31, which extends downwardly from top wall 27 and is fixed thereto, as by welding. Deflector plate 31 is generally parallel to rear wall portion 29, and it cooperates with the wall portion to guide crop material inwardly toward pick-up 18.

At the forward end of the housing, a vertically extending shield 32 is mounted to engage tall plants and direct them into the chopper housing. Shield 32 is spaced from the housing 24, as shown in FIG. 2, to allow trash which passes over the shield to fall through to the ground. A slotted resilient sheet 34 is mounted to housing 24 by elements 35.

A chopper rotor 36 is journalled in side walls 25 and 26 and comprises a central shaft 37 and a plurality of flail-like chopper knives 38. Chopper knives 38 are pivotally mounted in spaced relation on bars 39. Bars 39 are mounted in lugs 40 which extend radially from shaft 37.

Chopper rotor 36 is powered through a drive sheave 44 which is secured to the outboard end of the rotor central shaft 37 and is driven by means of a belt 45 connected to flywheel 15. From flywheel 15, belt 45 extends under an idler pulley 46 on bale case 14, around a first guide sheave 47 on housing 24 at the outboard end thereof, and then to drive sheave 44; from sheave 44, belt 45 moves around a second guide sheave 48 on housing 24 and located directly under guide sheave 47, over a second idler pulley 49 on bale case 14 and then back to flywheel 15. Flywheel 15 receives its power through a P.T.O. shaft 50 shown fragmentarily in FIG. 1, which is connected to the tractor, not shown.

Chopper 12 is removably attached to baler 11 at three points. A first connection 51 is made on bale case 14 and connections 52 and 53 are located at the outboard side of the machine. A channel member 54 extends between pin connection 52 and chopper housing 24. A first push rod 55 is adjustably connected to bar 54 adjacent pin connection 52, and at its forward end, rod 54 is connected to mounting bracket 56 on castor wheel 57. A second push rod 58 has a rear end which is connected by pin connection 53 to an element 60 fixed to baler axle 61 and has a forward end connected to mounting 62 by a pin 63. Mounting 62 is fixed to a slider plate 64.

Support means for chopper housing 24 comprises a first pair of guide tracks 70 and 71 mounted on inboard side wall 25, and a second pair of guide tracks 72 and 73 mounted on outboard side wall 26. Guide tracks 70 and 71 are adapted to slidably receive a plate 74 at the chopper inboard end, and tracks 72 and 73 slidably receive plate 64 at the outboard end. Plate 74 is removably connected to bale case 14 by means of a pin 75. Plate 64 is connected to wheel mounting bracket 56 which is supported by wheel 57.

A lift system 80 is mounted on chopper housing 24 and provides for movement of the housing relative to plates 74 and 64 to effect a vertical adjustment of the chopper. Lift system 80 comprises a rockshaft 81 pivotally mounted in brackets 82 and 83 at the forward end of the chopper. An upwardly extending arm 84 carried on rockshaft 81 is connected to actuating means for pivoting the rockshaft. A lever 85 connects rockshaft 81 to plate 74, and a lever 86 connects the rockshaft to plate 64 at the outboard side of the machine. At the rear end of the chopper, a stationary tube 90 is mounted to chopper housing 24 by means of elements 91 and 92. A radial member 93 extends upwardly from tube 90, and at its upper end is connected at 94 to an internally threaded cylinder 95. A screw rod 96 having a handle 97 is threadably received in cylinder 95. Rod 96 is fixed to a collar 98 which is connected to element 84 through a link 99. It will be apparent that when rod 96 is rotated by turning handle 97, rockshaft 81 will be caused to pivot. The pivotal movement of rockshaft 81 will move the chopper housing and the rotor carried thereby in a vertical direction, the direction of movement, of course, depending on the direction of rotation of the screw rod 96.

In operation, machine 10 is drawn through a field in a forward direction by a tractor, not shown. The various components of the chopper and the baler units are driven by the tractor power take-off through P.T.O. shaft 50. Chopper knives 38 serve to sever the crop material, fling it upward and rearward to the baler pick-up 18. The baler pick-up 18 slows the crop material down, aligns it, and uniformly delivers it the feed chamber 21. From the feed chamber, the stalks are fed into the bale case where they are compressed and formed into bales.

Material severed by the chopper moves upwardly and rearwardly in the form of a mat in contact with the underside of housing top wall 27. As the material moves rearwardly, the chopper deflector means comprising deflector plate 31 and wall portion 29 will turn the material inwardly toward the pick-up. Since the mat of material is relatively thin, most of the material will be turned in by deflector plate 31. If some material gets by plate 31, it will be flung against wall portion 29 and deflected inwardly. An additional effect of wall portion 29 is to serve as a means for turning the rearwardly moving air currents created by rotor 36 inwardly toward the pick-up. Thus, some particles of crop material carried in the air stream will be turned inwardly without actual contact with the wall portion.

From the foregoing discussion, it will be seen that a novel means has been disclosed for consolidating crop material collected by a rotary chopper; thus, a relatively wide chopper can be used in combination with a conventional pick-up baler. By positioning the plate 31 above the rotor instead of rearwardly thereof, the chopper can be closely spaced to the baler which results in a compact machine and eliminates the necessity for additional guide means for the crop material.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having described my invention, what I claim is:

1. An agricultural machine adapted to travel in a forward direction over a field of crops, said machine comprising:

a bale case at one side extending generally in a fore-and-aft direction and having an upright side wall with a feed opening therein;

a feed chamber extending laterally outwardly from said bale case, said feed chamber being in communication with said feed opening and having an outboard end spaced laterally from said upright side wall;

a pick-up mounted forwardly and downwardly of said feed chamber and supported for rotation about an axis transverse to the direction of travel, said pick-up having crop-engaging means which direct the crop material to said feed chamber, said pick-up having an inboard end adjacent said bale case and an outboard end spaced laterally therefrom;

a side chopper including a chopper housing positioned forwardly of said pick-up, said housing having an inboard side wall along said upright side wall of the bale case and an outboard side wall spaced laterally therefrom, said outboard side wall being spaced laterally outward from said pick-up outboard end, said chopper inboard and outboard walls being joined by a laterally extending top wall;

a rotor journalled in said chopper inboard and outboard sidewalls, said rotor comprising a central shaft and a plurality of flail-like elements axially spaced on said shaft, a portion of said elements being located laterally outward from said pick-up outboard end, said rotor being rotatable to cause said elements to collect crop material from the field and sweep the material upwardly and rearwardly ;and deflector means comprising the combination of a deflector plate extending downwardly from said top wall over said rotor and at an angle to said central shaft with a rear end located laterally inwardly from a forward end on said outboard side wall and of a rear wall portion extending downwardly from said top wall with a rear edge located laterally inwardly from a forward edge on said outboard side wall at an angle to said central shaft corresponding to the angle of said deflector plate whereby said chopper rotor moves material upwardly and rearwardly in the form of a mat along said top wall for turning the mat rearwardly to said pick-up with the outboard portions of the mat deflected by said deflector plate and rear wall portion inwardly to said pick-up for delivery of material to said feed chamber.

2. An agricultural machine as set forth in claim 1 wherein said deflector plate and said rear wall portion are substantially parallel.

3. An agricultural machine as set forth in claim 1 wherein said deflector plate terminates above said central shaft and said rear wall portion extends below said central shaft.

References Cited
UNITED STATES PATENTS

| | | | |
|---|---|---|---|
| 2,795,913 | 6/1957 | Skromme et al. | 56—24 |
| 3,295,299 | 1/1967 | Brady et al. | 56—24 |
| 3,306,015 | 2/1967 | Myers | 56—24 |
| 3,354,624 | 11/1967 | Hoch | 56—24 |
| 3,362,144 | 1/1968 | Bumgardner | 56—24 |

LOUIS G. MANCENE, Primary Examiner

PASQUALE A. RAZZANO, Assistant Examiner

U.S. Cl. X.R.

56—364